United States Patent [19]
Ye et al.

[11] Patent Number: 5,982,582
[45] Date of Patent: *Nov. 9, 1999

[54] FLYING-TYPE MAGNETIC HEAD AND HAVING RHOMBIC OR CUT RHOMBIC LUBRICATING SURFACES

[75] Inventors: Xinhua Ye, Hamamatsu; Takashi Furuoya, Kawasaki; Aiji Matsumoto, Hamamatsu, all of Japan

[73] Assignee: Minebea Co., Ltd., Nagano, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,005

[22] Filed: May 29, 1996

[30] Foreign Application Priority Data

May 29, 1995 [JP] Japan ................................. 7-130492

[51] Int. Cl.⁶ ........................................................ G11B 5/60
[52] U.S. Cl. ............................................................ 360/103
[58] Field of Search ..................................... 360/103, 122

[56] References Cited

U.S. PATENT DOCUMENTS

| | | | |
|---|---|---|---|
| 3,754,104 | 8/1973 | Piper et al. | 360/103 |
| 3,990,106 | 11/1976 | Kameyama et al. | 360/103 |
| 4,553,184 | 11/1985 | Ogishima | 360/103 |
| 5,212,608 | 5/1993 | Yoneoka | 360/103 |
| 5,278,711 | 1/1994 | Gregory et al. | 360/103 |
| 5,383,073 | 1/1995 | Masukawa et al. | 360/103 |
| 5,404,256 | 4/1995 | White | 360/103 |
| 5,424,888 | 6/1995 | Hendriks et al. | 360/103 |
| 5,430,591 | 7/1995 | Takeuchi et al. | 360/103 |
| 5,473,485 | 12/1995 | Leung et al. | 360/103 |
| 5,490,027 | 2/1996 | Hamilton et al. | 360/103 |
| 5,499,149 | 3/1996 | Dovek | 360/103 |
| 5,509,554 | 4/1996 | Samuelson et al. | 360/103 |
| 5,526,204 | 6/1996 | French et al. | 360/103 |
| 5,537,273 | 7/1996 | Hendriks et al. | 360/103 |
| 5,550,693 | 8/1996 | Hendriks et al. | 360/103 |
| 5,673,161 | 9/1997 | Yanagisawa et al. | 360/103 |

FOREIGN PATENT DOCUMENTS

04/281209  10/1992  Japan.

*Primary Examiner*—Craig A. Renner
*Attorney, Agent, or Firm*—Staas & Halsey

[57] ABSTRACT

A flying-type magnetic head has a slider having stable flying and a constant flying height and a method of manufacturing the same. A plurality of substantially parallel ground groove groups each having a positive angle with respect to the fluid inflowing direction of a slider and a plurality of substantiality parallel ground groove groups each having a negative angle are formed by cutting on a plate surface state of a material, and intersect to form the fluid lubricating surface having a rhombic shape or a truncated rhombic shape. The slider is cut out in a range including at least three of the fluid lubricating surfaces, thereby constructing a flying-type magnetic head. In this case, the fluid lubricating surface having the rhombic shape or a shape near the rhombic shape can be employed in the slider, and can also be employed in the shape where part of the rhombic shape is cut out. In the embodiment, the slider is so cut out that two fluid lubricating surfaces are disposed at the fluid inflow end, and one fluid lubricating surface at the fluid discharge end. However, the slider may be so cut out that one fluid lubricating surface is disposed at one inflowing end and two fluid lubricating surfaces are disposed at one discharge end.

4 Claims, 13 Drawing Sheets

AIR INFLOWING DIRECTION

FLYING-TYPE MAGNETIC HEAD AND HAVING RHOMBIC OR CUT RHOMBIC LUBRICATING SURFACES

BACKGROUND OF THE INVENTION

1. FIELD OF THE INVENTION

This invention relates to a flying type magnetic head to be used for a magnetic recorder and a method of manufacturing the same.

2. DESCRIPTION OF THE PRIOR ART

In a magnetic recorder used as the external memory of a computer, a gap spacing between a magnetic recording medium (hereinafter referred to as a "magnetic disk") and a magnetic recording/reproducing head (hereinafter referred to as a "magnetic head") has a large influence on a recording density. The smaller the spacing is, the higher a recording density becomes. To hold the gap spacing between the magnetic disk and the magnetic head in a magnetic disk apparatus, a flying type magnetic head is used in which a slider for holding the magnetic head is approached onto the rotating magnetic disk to fly the slider slightly above the magnetic disk surface by means of an air flow upon rotation of the magnetic disk.

At present to access a recorded track on a magnetic disk, a swing arm type actuator is employed. In this actuator, a slider is held at the end of a suspension supported at one point, and the slider is so moved as to shake its head from the inner periphery to the outer periphery of the magnetic disk or vice versa at its fulcrum as a center and positioned at a predetermined track.

In such a flying type magnetic head, there arises a variation in a flying height due to the speed difference between the magnetic disk and the magnetic head at the inner and outer peripheries of the magnetic disk, and a variation in the flying height due to an air inflow angle (hereinafter referred to as a "skew") of the magnetic disk with respect to the slider at the inner and outer peripheries of the magnetic disk. Thus, the flying height varies according to the position of the track.

The flying height of the magnetic head largely has an influence on recording and reproducing characteristics of the magnetic head. Thus, the variation in the flying height described above is a large problem in the magnetic disk apparatus. Accordingly, a constant flying height slider for holding a constant flying height of the magnetic disk at any position of the magnetic disk is desired.

On the other hand, when the magnetic disk is stopped steadily, the magnetic head is in contact with the magnetic disk. When the magnetic disk starts to rotate, the air starts to flow into between the magnetic disk and the magnetic head, and fence the magnetic head starts to fly. Accordingly, at the time of starting, the magnetic disk and the magnetic head are in a sliding state for a certain period. Thereafter, the magnetic head flies from the magnetic disk. To enhance the reliability, the sliding state of the magnetic head is preferably as short as possible. In addition when the magnetic head is temporarily deviated from the stable state due to external disturbance, it is desirable to be able to restore quickly the stable state without contact with the magnetic disk.

As described above, it is desired in the magnetic disk apparatus using the present flying type magnetic head that the flying height of the magnetic head of the magnetic disk apparatus is always constant on the inner and outer peripheries of the magnetic disk, the time required for flying the magnetic head at the time of starting (hereinafter called a "take-off time") is as short as possible and a restoring force against external disturbance is large.

The above-described characteristics of the magnetic disk apparatus largely depend upon the shape of the surface of the slider opposed to the magnetic disk (hereinafter called a "fluid lubricating surface"). Thus, the sliders which have various fluid lubricating surfaces have been developed at present. The shapes of the sliders have been growing complicated year after year. Therefore, the processing of the slider becomes impossible only by the conventional mere grinding technique, and hence precise processing techniques such as an ion milling or an optical etching using optical exposure technique starts to be introduced.

However, these techniques lead to an increase in processing steps, resulting in a decrease in the yield of products. Simultaneously, its manufacturing cost increases.

Figure 10:
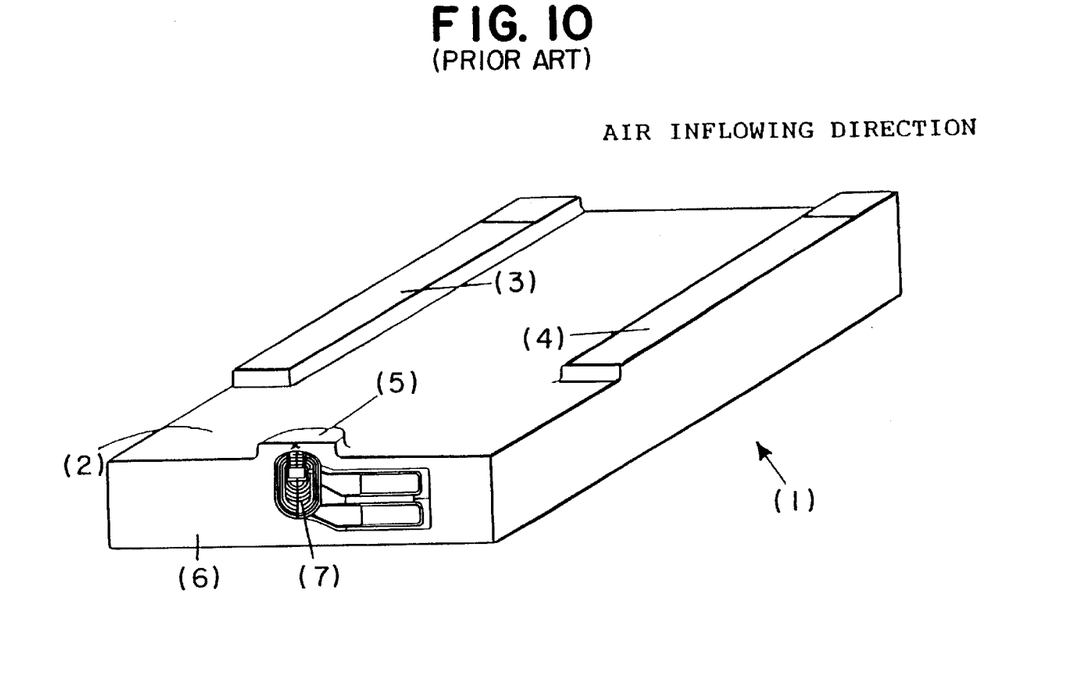
FIG. 10 is a perspective view showing a conventional slider.

To solve such inconveniences, a tripad slider was recently disclosed from Read Write Co. FIG. 10 is a perspective view showing this tripad slider. This slider is considered as one of the excellent sliders which has a short take-off time and low flying height characteristics.

In FIG. 10, rails 3 and 4 extend in the longitudinal direction of a slider 2 for forming a magnetic head and are formed at the right and left sides of the fluid inflowing side of the upper surface of the slider 2, i.e., the fluid lubricating surface. A protrusion 5 isolated at the fluid discharge side is provided at the rear end face 6 of the slider 2 in the same height as the rails 3 and 4. Recording and reproducing heads 7 are mounted at the center of the rear end face 6 of the slider 2.

Figure 11:
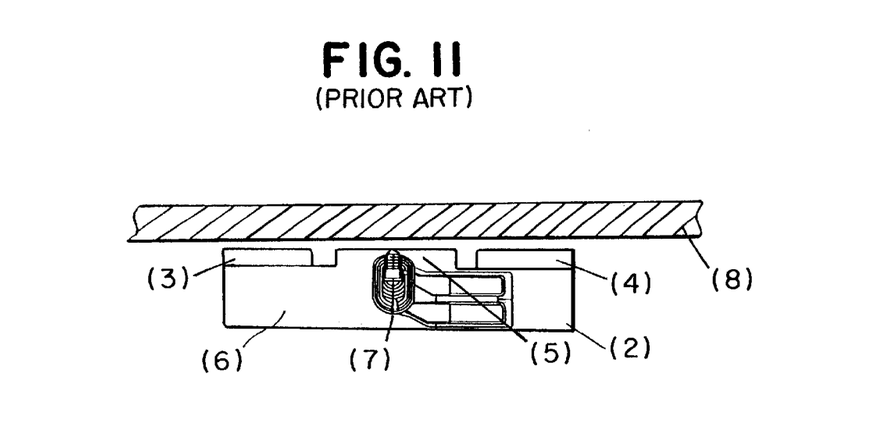
FIG. 11 is a rear view showing the operating state f the conventional slider.

As shown in FIG. 11, the rails 3, 4 and the protrusion 5, i.e., the fluid lubricating surfaces, are opposed to the magnetic disk 8. A flow occurs in the fluid by the rotation of the magnetic disk 8, and hence the magnetic recording and reproducing heads 7 are slightly flying above the magnetic disk 8 by the fluid bearing action.

The features of this flying type magnetic head 1 are:
1) the possibility of processing the fluid lubricating surface by the conventional grinding,
2) stable floating in a low flying height, and
3) short take-off time.

The rails 3 and 4 of the slider each have an oblong shape, and are terminated at the vicinity of the central part of the slider. The protrusion 5 having the same height as those of the rails 3 and 4 is provided at a central groove between the rails 3 and 4 at the rear part of the slider. This structure causes the machining of the slider surface to be very difficult. More specifically, since the grinding of the slider surface must retain the protrusion 5 at the central part, the grooving must be stopped on the midway. Further, several stripes of perpendicular ground grooves must be combined under control. The smaller the size of the slider becomes, the more difficult the processing becomes.

Figure 12A:
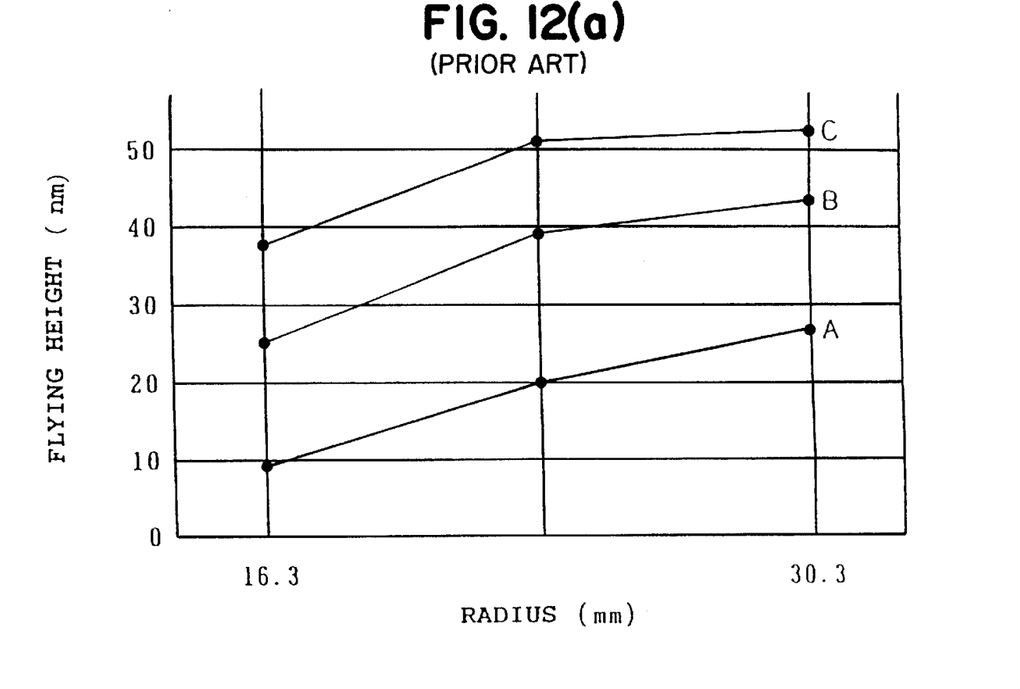
FIGS. 12(a) and 12(b) are characteristic diagrams showing the flying characteristics of the conventional slider.
Figure 12B:
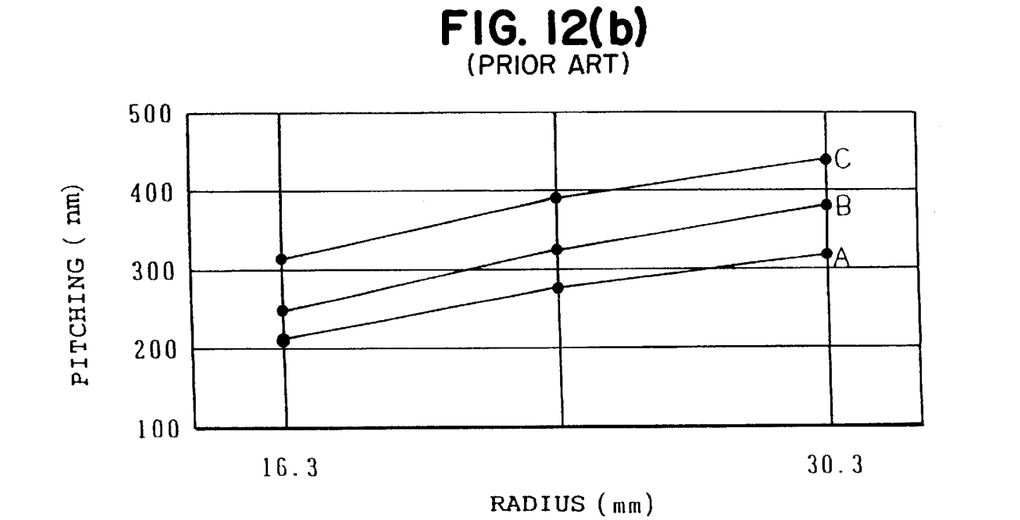

The flying characteristics of this slider are shown in FIGS. 12($a$) and 12($b$). FIGS. 12($a$) and 12($b$) show the results of the simulations of the flying height (a distance between the end of the magnetic head and the surface of the magnetic disk) and the pitching (the difference of the flying height between the fluid inflow end and discharge end of the slider) of the slider along the radial direction of the magnetic disk by altering the area of the fluid lubricating surface (corresponding to curves A, B and C in the drawings).

When the curve B in FIG. 12($a$) is observed as one example of the flying characteristics, the flying height is 25 nm on the inner periphery of the magnetic disk and 43 nm on the outer periphery of the magnetic disk. In the case of this slider, the variation in the flying height of the magnetic head on the inner and outer peripheries of the magnetic disk is +72%. Similarly, the pitching of the slider increases as the radius of the slider increases. That is, when the curve B in FIG. 12(b) is observed, the variation in the pitching of the slider increases by 50% on the outer periphery of the magnetic disk.

The protrusion 5 of this slider has a surface substantially perpendicular to the fluid inflow direction. The perpendicular surface of the slider feasibly causes a problem of a head crush due to the adhesion and retention of dust in the air. In this case, to form the shape for reducing the retention of the dusts, it is impossible to grind the shape and must employ complicated processing steps such as ion etching to form the shape used in the process.

Figure 13:
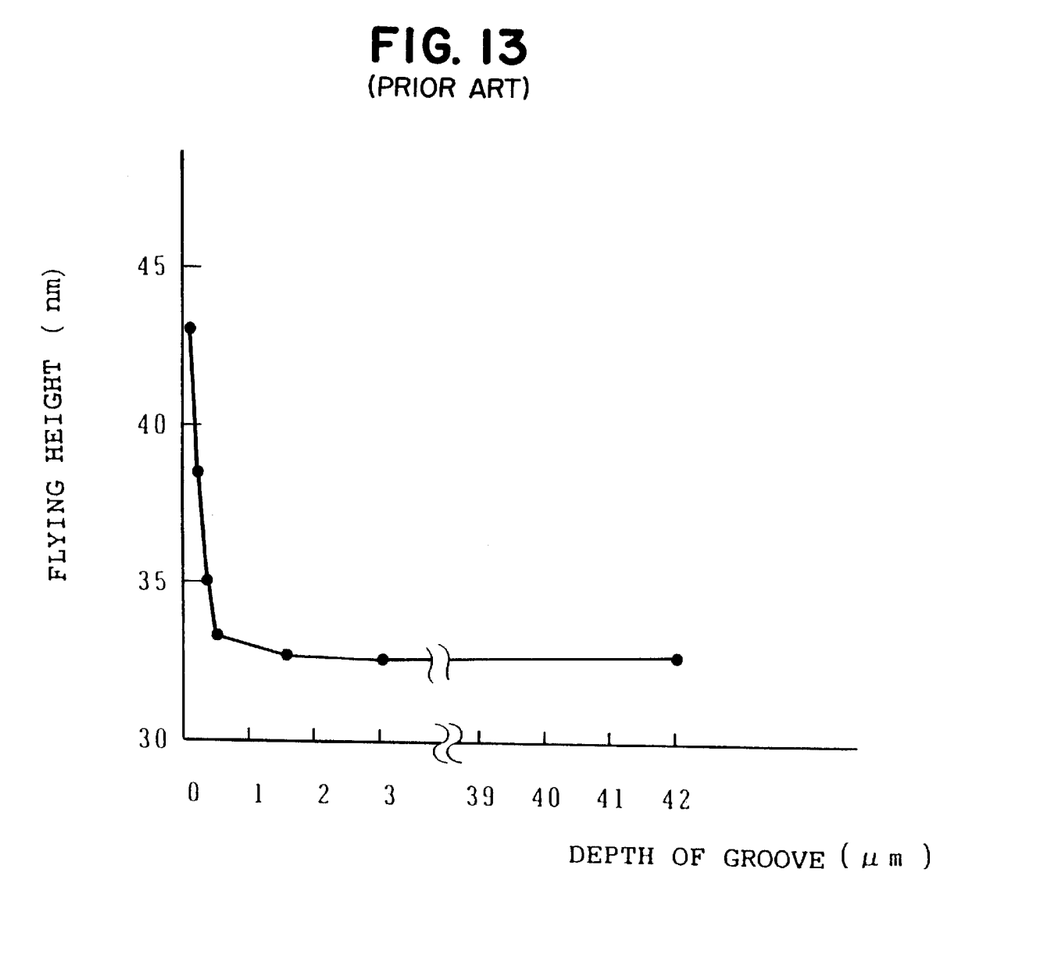
FIG. 13 is a characteristic diagram showing the relationship between the flying height and the depth of the ground groove of the conventional slider.

FIG. 13 shows the variation in the flying height of the slider in terms of the depth of the ground groove for reference. When the depth of the groove becomes 1 $\mu$m or more, the variation in the flying height is eliminated. That is, with the groove of 1 $\mu$m or less, the characteristics of the slider largely alter according to the depth of the groove, but if the groove of 1 $\mu$m or more is formed, constant flying characteristics can be obtained. Therefore, this slider can incorporate sufficiently stable flying characteristics with high mechanical grinding accuracy.

SUMMARY OF THE INVENTION

This invention provides a flying type magnetic head having a slider in which the conventional grinding process can be applied as it is in the processing of a fluid lubricating surface and which generates a stable flying and has a constant flying height and a method of manufacturing the same.

This invention can process by using the conventional grinding technique, and provides the shape of the fluid lubricating surface of the slider which has more excellent constant flying height characteristics than the prior art, short and stable take-off time. Thus, a low-cost and high-performance flying type magnetic head and a method of manufacturing the same are provided.

Further, the features of this invention reside in the slider consisting of three fluid lubricating surfaces of the substantially rhombic shape or the shape deformed from the rhombic shape by mechanically processing under the cutting condition of a certain angle with respect to the longitudinal direction of the slider for the purpose of forming the fluid lubricating surfaces and a method of manufacturing the same.

Mere cutting process is used to form the fluid lubricating surface of the slider, and the fluid lubricating surface formed in this manner imparts excellent flying characteristics and excellent take-off characteristics to the slider.

DESCRIPTION OF THE PREFERRED EMBODIMENTS

An embodiment of this invention will be described in detail with reference to the accompanying drawings.

Figure 1:
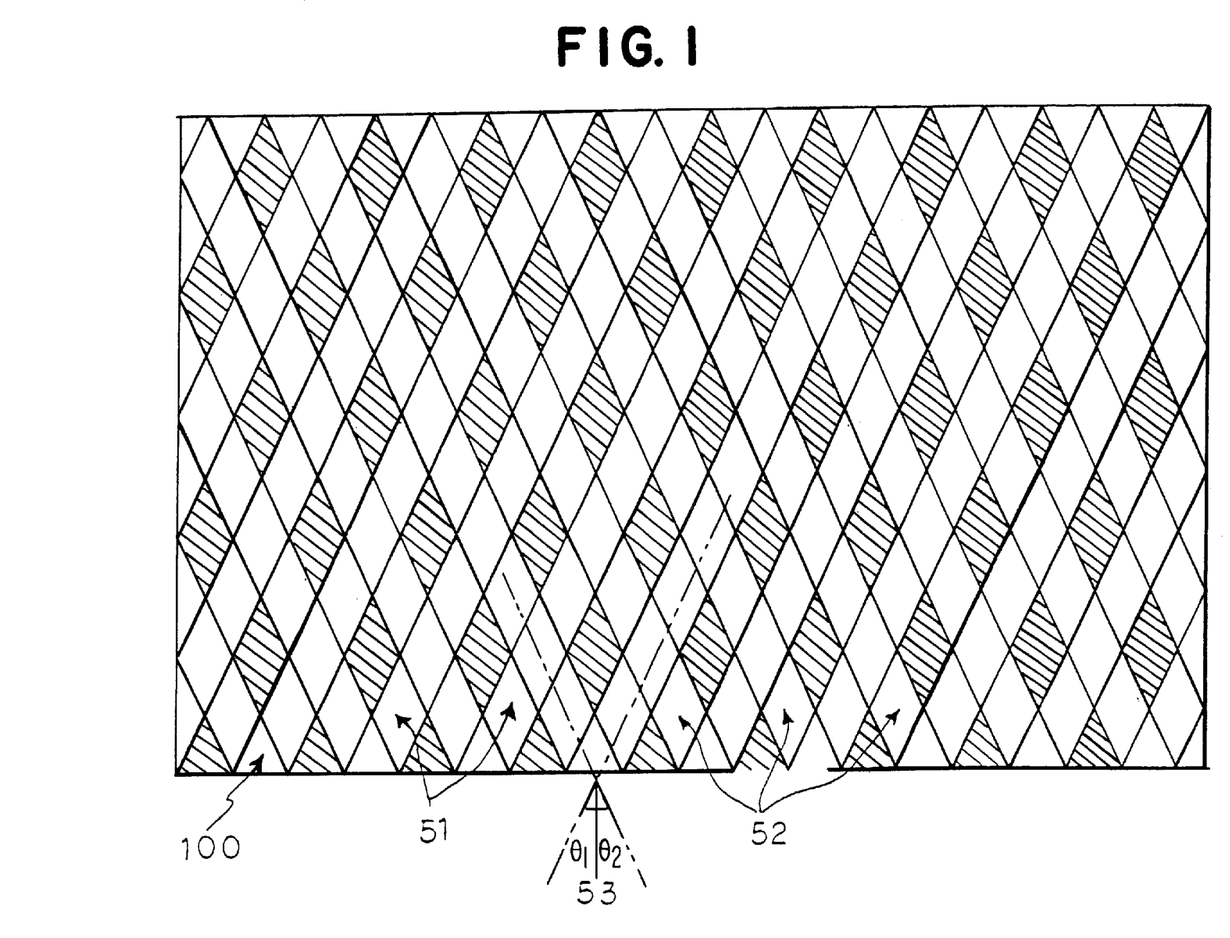
FIG. 1 is a partial plan view showing the steps of an embodiment for manufacturing a slider of a magnetic head according to this invention.

FIG. 1 is a partial plan view showing the step of manufacturing the slider of a magnetic head according to this invention. In the case of manufacturing the slider according to this invention, a plurality of stripes of shallow rectilinear first ground grooves are formed at a predetermined interval on the surface of a material made of one ceramic plate such as, alumina or alnic platelike material. Further, a plurality of stripes of shallow rectilinear second ground grooves of the same interval as the first ground grooves crossing the first grooves at a predetermined angle thereto are formed by cutting. FIG. 1 is a view in which a semi-fabricated product on the way of processing is drawn from the front surface. The surface which is not cut by these cutting processes becomes a fluid lubricating surface.

The method of manufacturing the slider will be described in more detail. In FIG. 1, a plurality of ground grooves {arrows 51} are formed at a constant interval with the inclination of a predetermined angle (θ1) with respect to a fluid inflow direction 53 on the surface of a slider forming material 100.

Then, a plurality of ground stripes {arrows 52} are formed at a predetermined interval with the inclination of a predetermined angle (θ2) in the opposite direction with respect to the inflow direction 53 of the above-described ground grooves. The ground grooves 51 and 52 each has a substantially rectangular sectional shape and a depth of 1 $\mu$m or more. The fluid lubricating surfaces of the rhombic shape can be formed in the dispositions at the vertices of an isosceles triangle by grinding.

Figure 2:
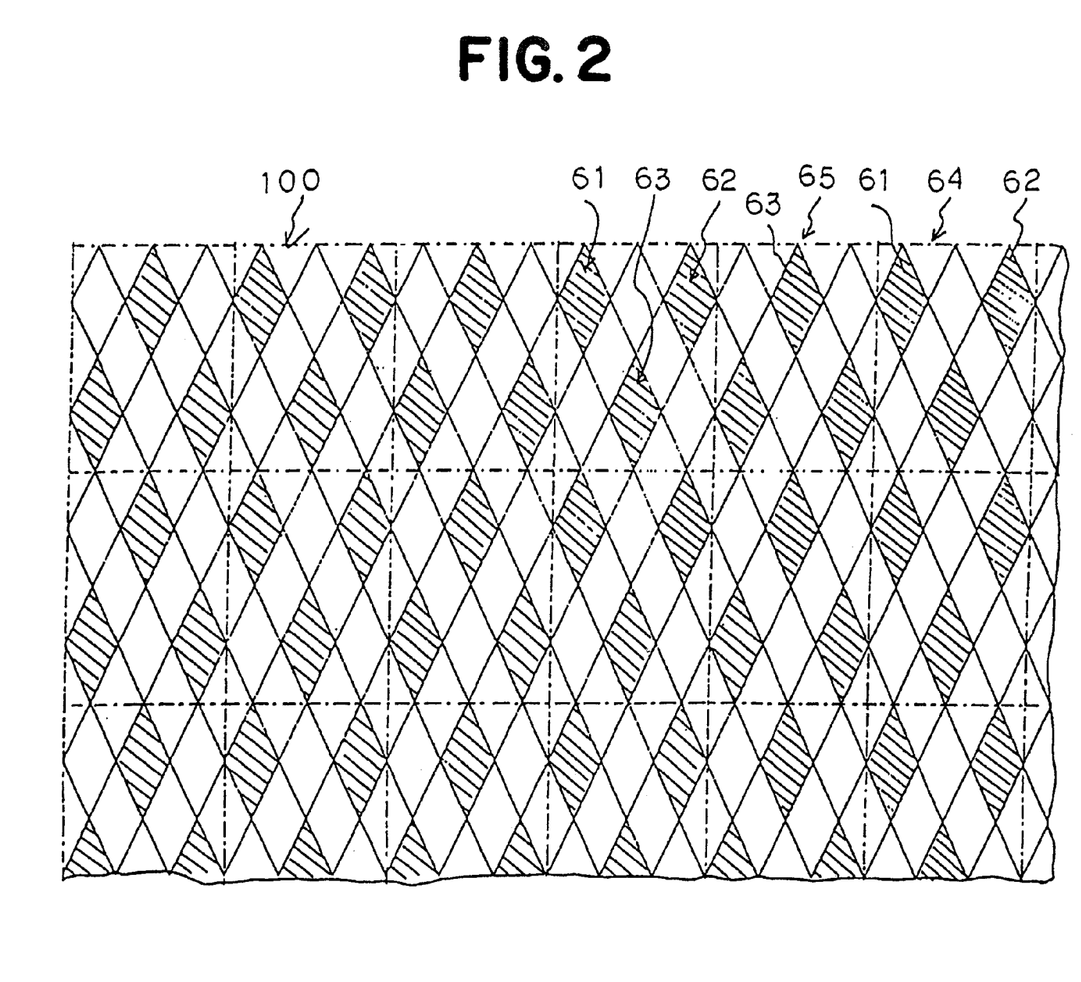
FIG. 2 is a partial plan view showing the steps proceeded from those of the state of FIG. 1 for manufacturing the slider of a magnetic head according to this invention.
Figure 3:
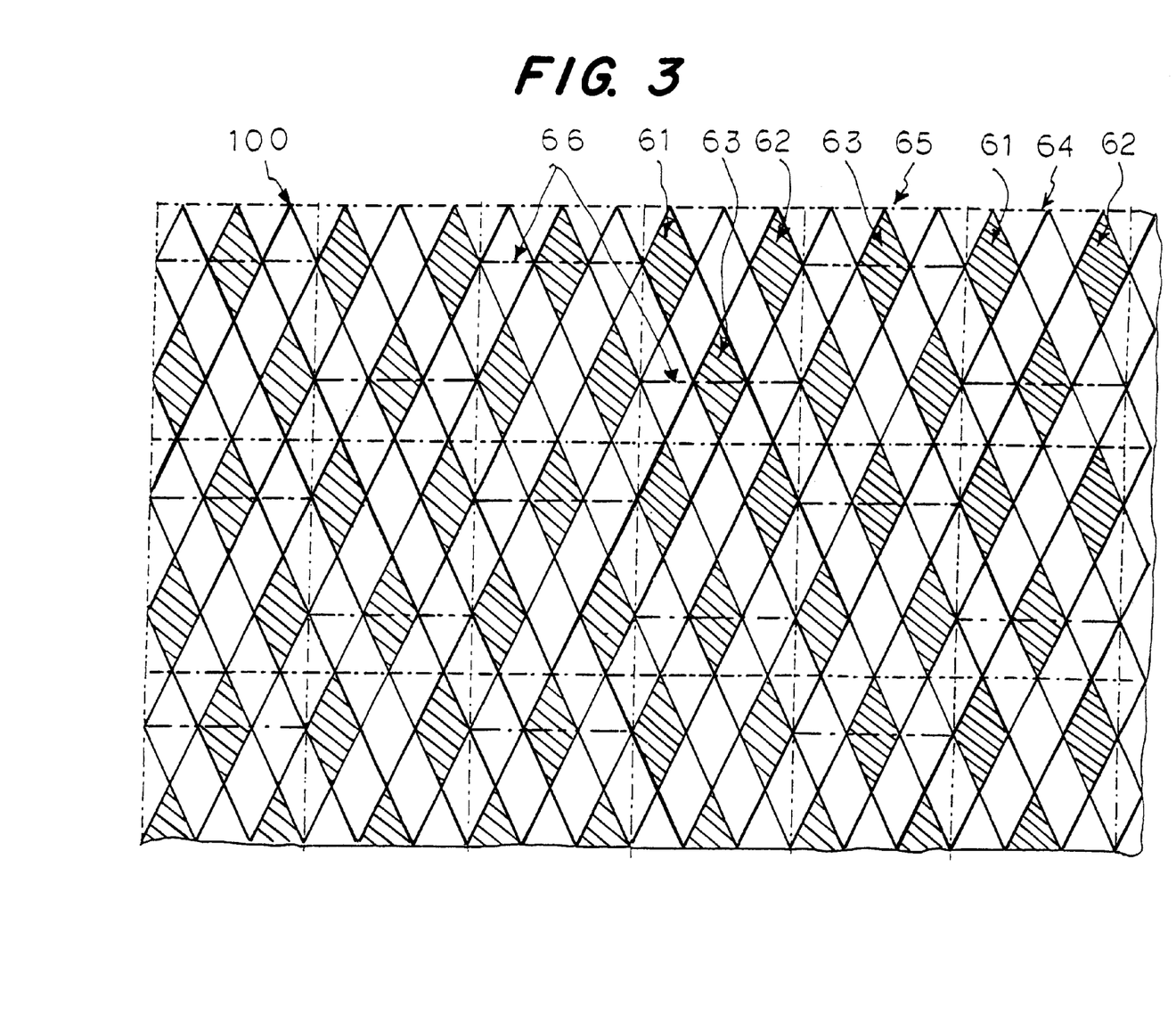
FIG. 3 is a partial plan view showing the steps proceeded from those of the state of FIG. 2 for manufacturing the slider of a magnetic head according to this invention.

As shown in FIG. 2, the slider forming material 100 is cut along a one-dotted chain line, and three fluid lubricating surfaces 61, 62 and 63 chosen from rhombic fluid lubricating surface group encompassed in the rectangular shape. In this case, the fluid lubricating surfaces 61 and 62 of the fluid inflow ends 64 are disposed in the manner that each of them is symmetrical right and left, and the fluid lubricating surfaces 63 of the fluid discharge ends 65 are disposed at the center of the slider. Then, as shown in FIG. 3, the slider forming material 100 is cut along a two-dotted chain line 66. The fluid lubricating surfaces 63 of the fluid discharge ends 65 are cut by about the half of the rhombic shape by this cutting.

Figure 4:
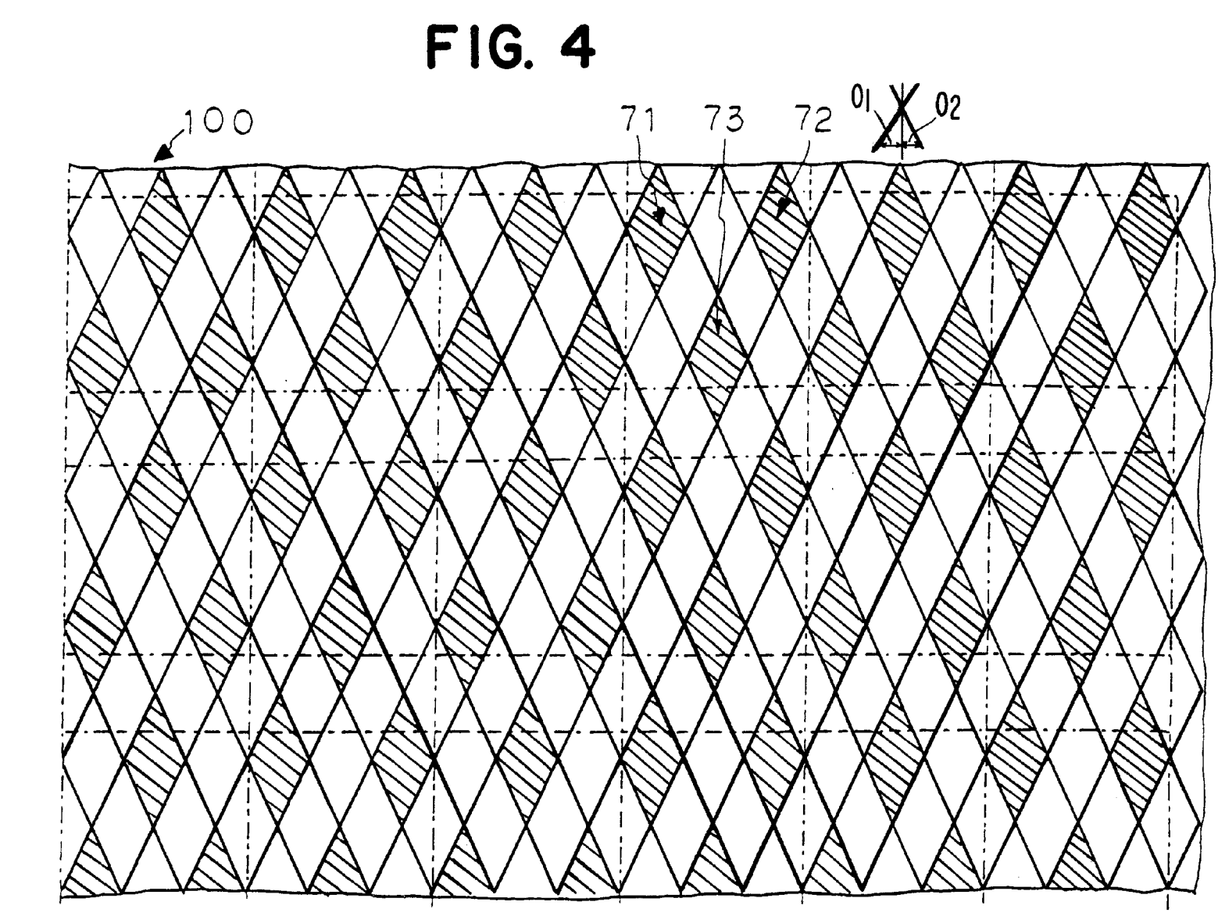
FIG. 4 is a partial plan view showing the steps of a second embodiment for manufacturing the slider of a magnetic head according to this invention.

FIG. 4 shows an example in which the slider of a square shape is cut out from the different position from those of FIGS. 2 and 3. In this case, the slider is cut from the position slightly deviated from the position shown in FIG. 2 in the fluid inflowing direction. In the case, fluid lubricating surfaces 71 and 72 of the fluid inflowing ends are formed in a pentagonal shape in which the end of the rhombic shape is cut out, and fluid lubricating surfaces 73 of the fluid discharge ends are formed in a pentagonal shape.

As is apparent from FIG. 4, in this embodiment, since the slider forming material 100 can be continuously cut, the cutting process of manufacturing the slider is more facilitated as compared with the embodiments shown in FIGS. 2 and 3.

Figure 5:
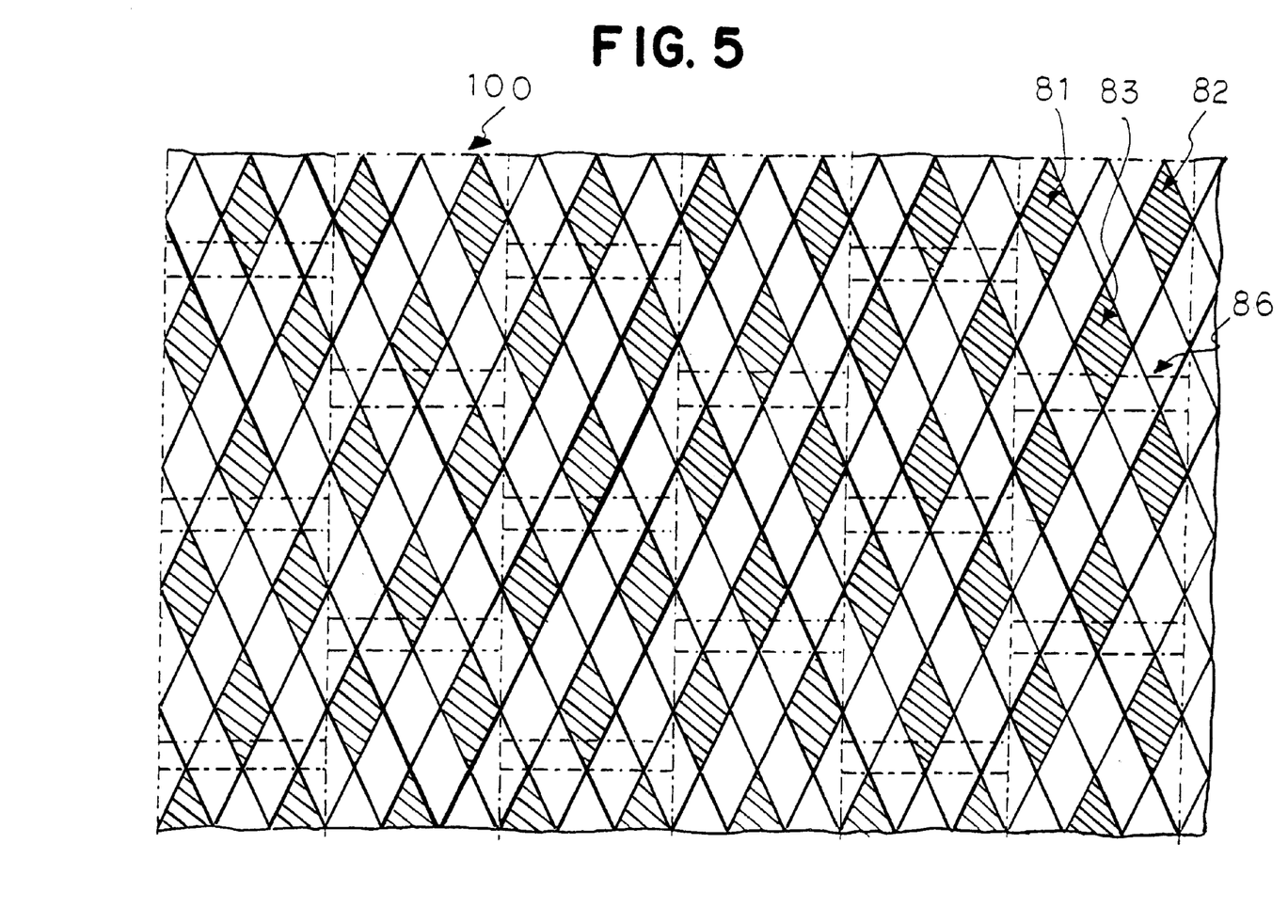
FIG. 5 is a partial plan view showing the steps of a third embodiment for manufacturing the slider of a magnetic head according to this invention.
Figure 6:
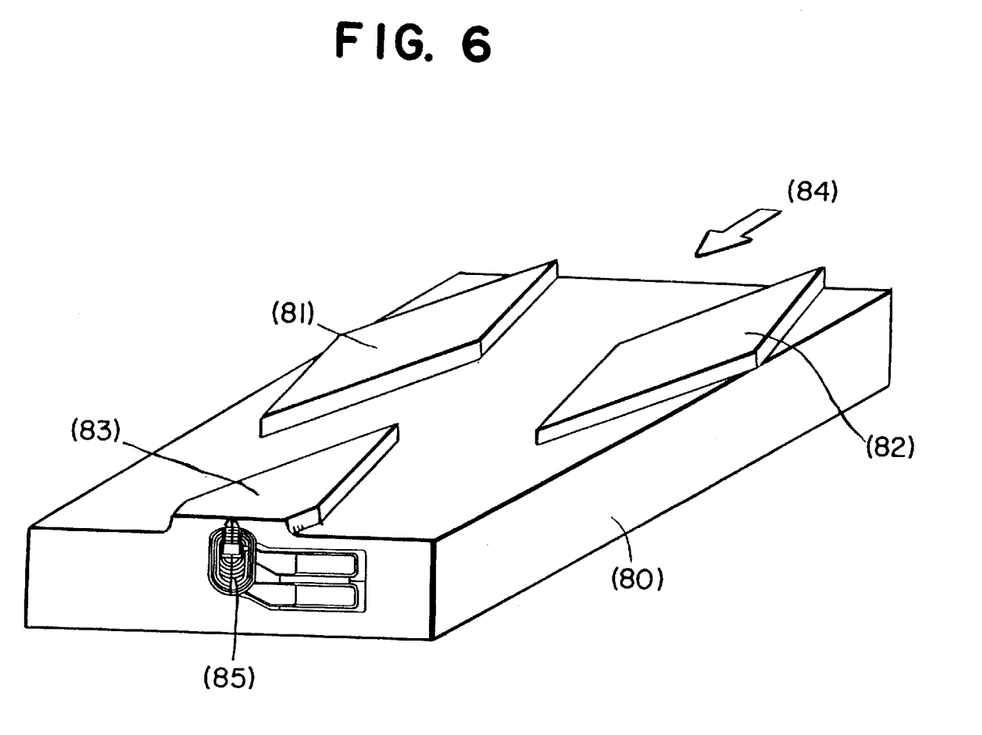
FIG. 6 is a perspective view of a slider manufactured according to the third embodiment.

FIG. 5 is still another embodiment of the slider of a square shape cut out from the different position from those of FIGS. 2, 3 and 4. As evident from FIG. 5, in this case, the fluid lubricating surfaces 81 and 82 of the fluid inflowing ends each has a rhombic shape, and the fluid lubricating surfaces 83 of the fluid discharge ends are cut at one-dotted chain line 86, and the lower portion of the rhombic shape is formed in a pentagonal shape in which the part is cut out. FIG. 6 is a perspective view of the slider formed in this manner. Two fluid lubricating surfaces 81 and 82 are provided at the fluid inflowing ends opposite to the fluid inflowing direction 84, and the fluid lubricating surfaces 83 of rhombic shape in which part of the rhombic shape is cut out is provided at the fluid discharge end. A magnetic head 85 is mounted at the discharge end of the slider 80. The cutting stripe angle of the embodiments of the above-described slider is 24°.

Figure 7A:
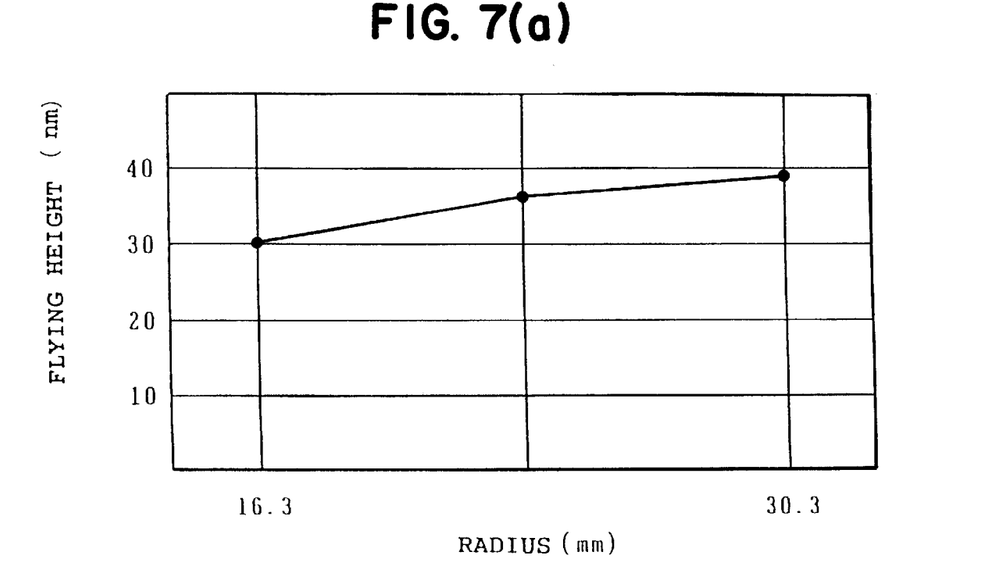
FIGS. 7(a) and 7(b) provides the flying characteristics (a) and the pitching characteristics of the slider shown in FIG. 5 and FIG. 6.
Figure 7B:
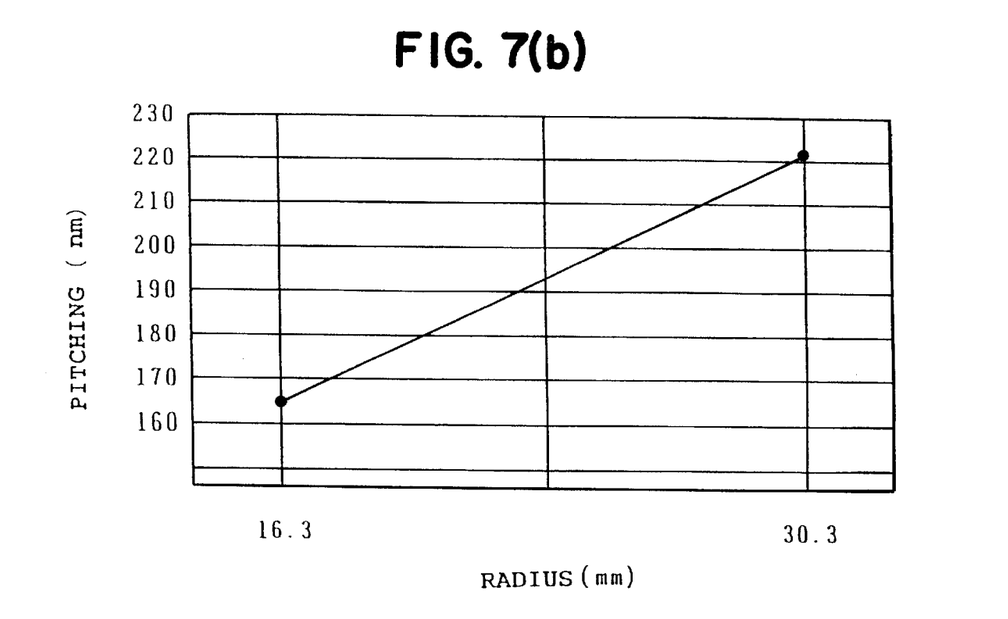

FIGS. 7(a) and 7(b) show the flying characteristics and the pitching characteristics of the slider shown in FIGS. 5 and 6. The flying height of the slider is 30 nm at the position of the radius of 16.3 mm of the magnetic disk and 39 nm at the position of the radius of 30.3 mm of the outermost periphery of the magnetic disk, and the increase in the flying height of the slider is 30%. As has already been described above, the flying height of the embodiments is reduced by about half or less as compared with 72% of the variation in the flying height of the conventional tripad at the peripheral speed.

FIG. 7(b) shows the radius dependency of the pitching of the slider. In this case, the pitching of the slider is 165 nm at the position of 16.3 mm of the innermost periphery and 222 nm at the position of 30.3 mm of the outermost periphery, and the variation amount is 34%, which means a reduction as large as 16% as compared with 50% of the tripad of the prior art.

Figure 8:
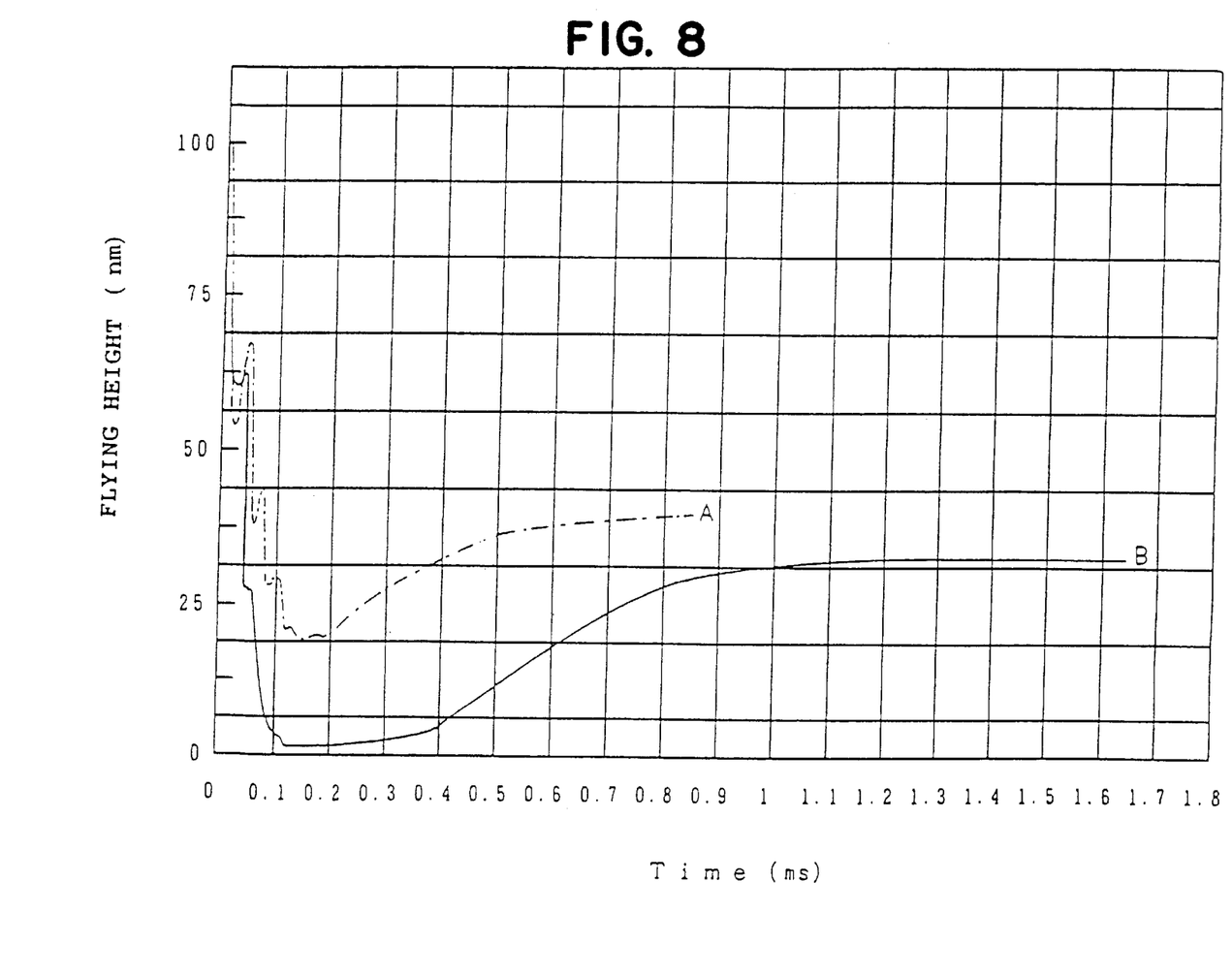
FIG. 8 is a characteristic diagram showing the transient response characteristics of the slider according to this invention and a tripad slider.

FIG. 8 shows the transient response characteristics of the slider according to this invention and the tripad slider of the prior art. That is, the magnetic head is fixed at a certain predetermined height (100 nm in the case of FIG. 8), and how the flying height of the magnetic head changes when the magnetic head is instantaneously separated from the fixed position is examined in terms of time.

As apparent from FIG. 8, in the case of the tripad of the prior art (the curve B), the tripad is in contact with the magnetic disk surface for a certain time, and then flies In addition the time for the tripad to reach the constant flying height is 1.41 ms, which is very long. On the other hand, in the slider having the fluid lubricating surface shown in FIGS. 5 and 6 of this invention (the curve A), the slider is not in contact with the magnetic disk, but arrives at the stable flying height, and the time for the slider to arrive at the stable flying is 0.7 msec, which is about half of that of the tripad slider. That is, the stability of the flying is excellent as compared with the prior art.

Figure 9A:
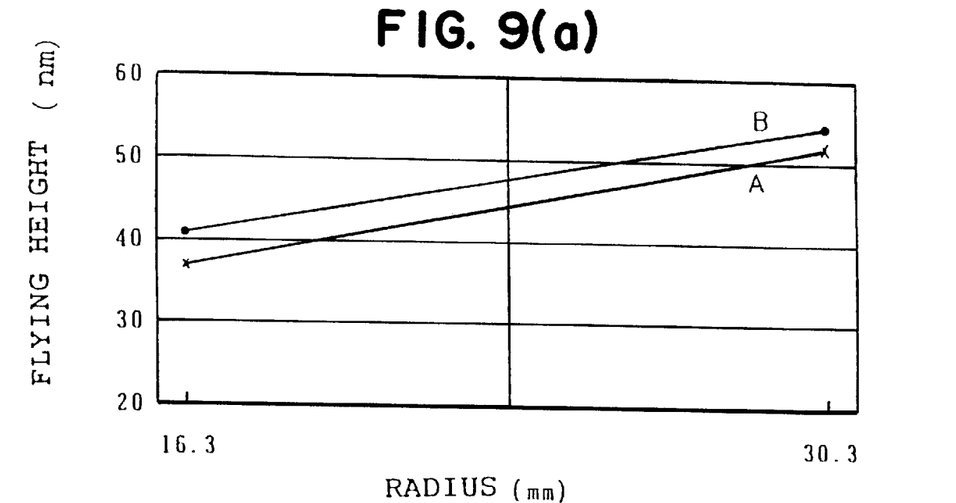
FIGS. 9(a)–9(c) are characteristic diagrams showing data when the angles θ1 and θ2 of the left and right sides of ground groove of the slider shown in FIG. 4 are set to 22°
Figure 9B:
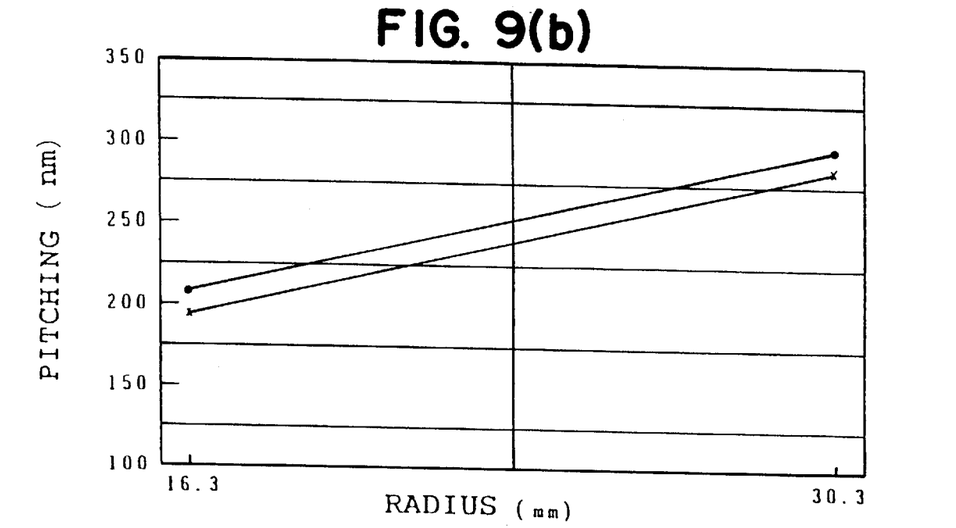
Figure 9C:
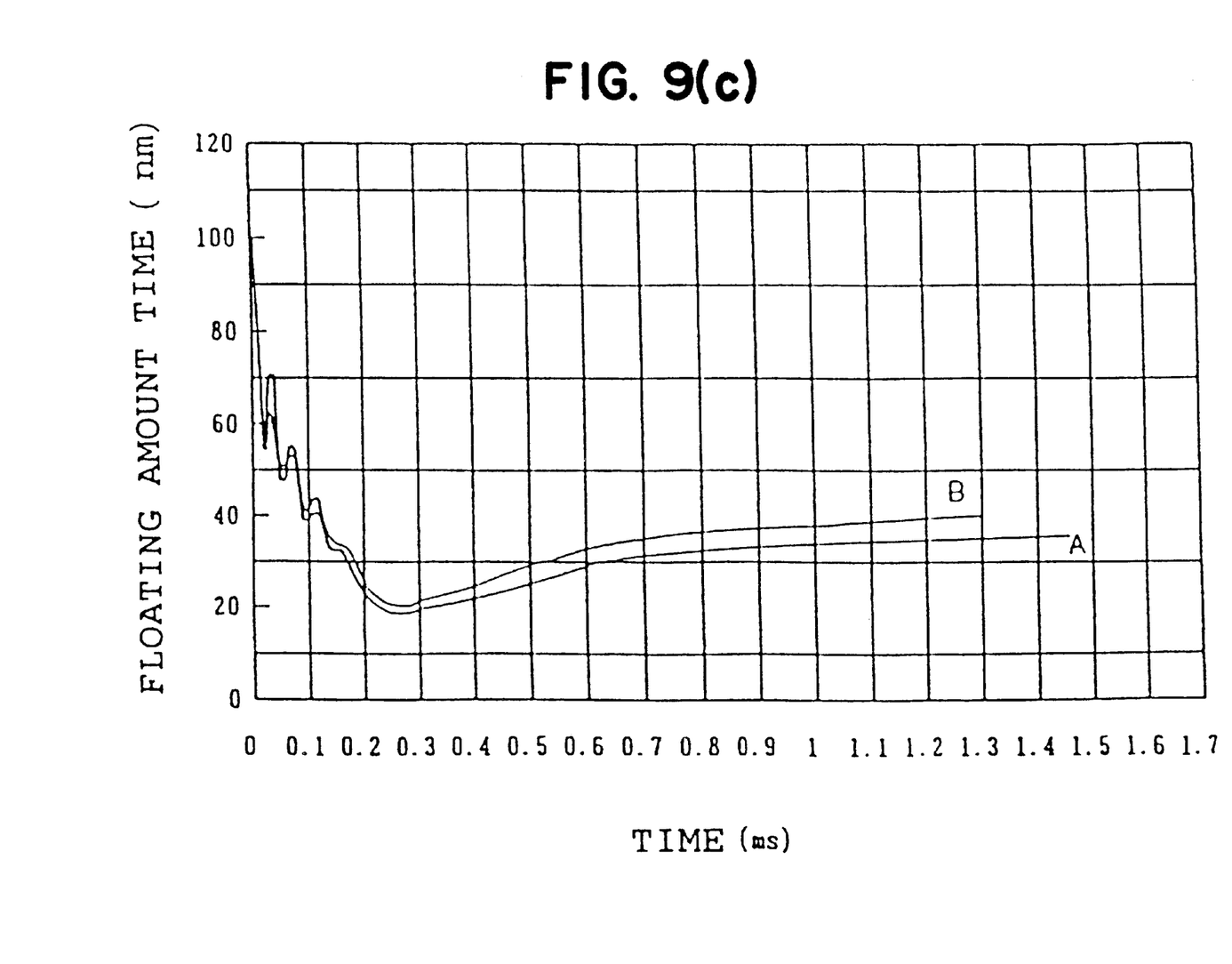

In the slider shown in FIG. 4, the data of the case that the left and right angles θ1 and θ2 of the ground groove are 22° are shown in FIGS. 9(a), 9(b) and 9(c). FIG. 9(a) shows the flying characteristics of the slider, and FIG. 9(b) shows the pitching characteristics of the slider. The curves A show the flying height and the pitching amount of the slider when the cut-out positions of the ground groove of the same angle and the same size from the rhombic lubricating surface as those of the embodiment shown in FIG. 2 are altered. The curves B show the flying height and the pitching amount of the slider when the ground groove angles θ1 and θ2 of the slider of FIG. 4 are set to 22°, and the flying height and the pitching amount of the slider are increased at the ratio of increasing the fluid lubricating surfaces, but it is understood that the gradient of the curve is not almost changed. FIG. 9(c) shows the transient response characteristics of the flying height.

This invention has been described with respect to the embodiments. In summary, the flying type magnetic head is constructed by using two sets of a plurality of parallel ground grooves, fundamentally so forming the ground grooves in the manner of leaving behind the protrusions to become the rhombic fluid lubricating surfaces on the slider surface, and cutting out the slider of substantially the square shape so as to include at least three protrusions.

With respect to the embodiments described above, it has been described based on that the two sets of the ground grooves each has an angle symmetrical with respect to the fluid inflowing direction of the slider. However, this invention is not limited only to the selection of the symmetrical angle. The width and the pitch of the ground grooves are not specified by this invention. In summary, the flying type magnetic head is constructed by the intersection of the plurality of substantially parallel ground groove groups each having a positive angle with respect to the fluid inflowing direction and the plurality of substantially parallel ground groove groups each having a negative angle to form the fluid lubricating surface having a rhombic shape or the shape near the rhombic shape, and by cutting out the slider in a range including at least three of the fluid lubricating surfaces. In this case, the fluid lubricating surface having the rhombic shape or the shape near the rhombic shape can be employed in the complete shape in the slider, and can also be employed in the shape in which part of the rhombic shape is cut out. In the embodiments described above, the slider is so cut out that two fluid lubricating surfaces are disposed at the fluid inflow end, and one fluid lubricating surface at the fluid discharge end. However, the slider may be so cut out that one fluid lubricating surface is disposed at one inflowing end and two fluid lubricating surfaces are disposed at one discharge end.

In the embodiments described above, the ground grooves have been described with respect to the example of rectilinear line. However, this invention is not limited to the particular embodiments. For example, the groove may be an arc shape or a circular arc shape.

As described above in detail, this invention can form the fluid lubricating surface of the slider by mere cutting, and provide easier processing than the conventional one. As a result, the manufacturing cost of the floating type magnetic head can be reduced. The slider having the fluid lubricating surface formed as described above exhibits excellent flying characteristics and take-off characteristics than the slider of the conventional type.

We claim:

1. A flying-type magnetic head slider comprising:
   at least two lubricating surfaces each having a rhombic shape and a flat surface; and
   a third lubricating surface having one of a rhombic shape and a truncated rhombic shape and having a flat surface;
   wherein said third lubricating surface is formed at an opposite end of said slider from said at least two lubricating surfaces;
   said third lubricating surface is formed on a center axis of said slider and said at least two lubricating surfaces are formed symmetrically about said center axis; and
   said at least two lubricating surfaces being disposed so that one corner of each rhombic shape thereof is disposed nearer to a slider fluid inflow edge than remaining corners of each rhombic shape of said at least two lubricating surfaces.

2. A flying-type magnetic head slider having a fluid inflow edge, a fluid discharge edge and a slider surface arranged to face a magnetic recording medium, the magnetic recording medium being subject to rotational movement whereby a fluid flow is caused between said slider surface and the magnetic recording medium, said flying-type magnetic head slider comprising:
   a plurality of protrusions formed on said slider surface, each protrusion having a lubricating surface for contacting and flying close to the magnetic recording medium;
   a pair of said protrusions being disposed immediately adjacent to said fluid inflow edge in a symmetrical form about a center axis of said flying-type magnetic head slider, the center axis extending between said fluid inflow edge and said fluid discharge edge; and
   said pair of said protrusions each having a rhombic shape such that a first diagonal line, which connects a first pair of opposing corners of each rhombic shape, is positioned substantially parallel to said fluid inflow edge and a second diagonal line, which connects a second pair of opposing corners of each rhombic shape, is disposed substantially normal to said fluid inflow edge.

3. A flying-type magnetic head slider having a fluid inflow edge, a fluid discharge edge and a slider surface arranged to face a magnetic recording medium, the magnetic recording medium being subject to rotational movement whereby a fluid flow is caused between said slider surface and the magnetic recording medium, said flying-type magnetic head slider comprising:
   a plurality of protrusions formed on said slider surface, each protrusion having a lubricating surface for contacting and flying close to the magnetic recording medium;
   a pair of said protrusions being disposed adjacent to said fluid inflow edge in a symmetrical form about a center axis of said flying-type magnetic head slider, the center axis extending between said fluid inflow edge and said fluid discharge edge;
   a third protrusion of said plurality of protrusions being disposed adjacent to said fluid discharge edge of said flying-type magnetic head slider and on the center axis of said flying-type magnetic head slider;
   said lubricating surfaces of said pair of said protrusions each having a rhombic shape such that a first diagonal line, which connects a first pair of opposing corners of each rhombic shape, is disposed substantially normal to said fluid inflow edge and a second diagonal line, which connects a second pair of opposing corners of each rhombic shape, is disposed substantially parallel to said fluid inflow edge; and
   said lubricating surface of said third protrusion having a truncated rhombic shape.

4. A flying-type magnetic head slider according to claim 3, wherein the truncated rhombic shape is a pentagon.

* * * * *

UNITED STATES PATENT AND TRADEMARK OFFICE
CERTIFICATE OF CORRECTION

PATENT NO.: 5,982,582
DATED : November 9, 1999
INVENTOR(S): Xinhua YE, et al.

It is certified that error appears in the above-identified patent and that said Letters Patent is hereby corrected as shown below:

Col. 1, line 53, change "fence" to --hence--.

Col. 2, line 23, after "head" insert --1--;
       line 32, change "surfaces are" to --surfaces, are--.

Col. 3, line 13, change "dusts" to --dust--.

Col. 5, line 66, change "1.41 ms" to --1.4 ms--.

Signed and Sealed this

Thirtieth Day of May, 2000

Attest:

Q. TODD DICKINSON

*Attesting Officer*    *Director of Patents and Trademarks*